June 12, 1928.

A. B. REAVIS 1,673,021

DIVIDED LOAD THRUST BEARING

Filed Oct. 19, 1922

WITNESSES:

A. B. Reavis
INVENTOR

BY
ATTORNEY

Patented June 12, 1928.

1,673,021

UNITED STATES PATENT OFFICE.

ANDREW B. REAVIS, OF SWARTHMORE, PENNSYLVANIA, ASSIGNOR TO WESTINGHOUSE ELECTRIC AND MANUFACTURING COMPANY, A CORPORATION OF PENNSYLVANIA.

DIVIDED-LOAD THRUST BEARING.

Application filed October 19, 1922. Serial No. 595,579.

My invention relates to thrust bearings of the multiple collar type, and it has for its object to provide apparatus of the character designated which shall permit of the accurate sub-division of the thrust among the respective collars of a bearing, in accordance with any predetermined requirements, in a simple and effective manner.

Figure 1:
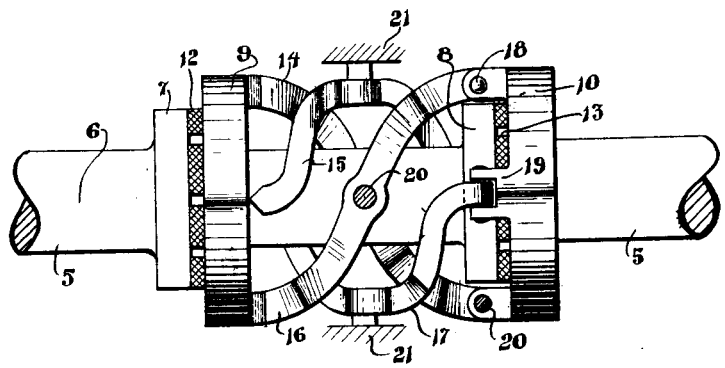
Figure 2:
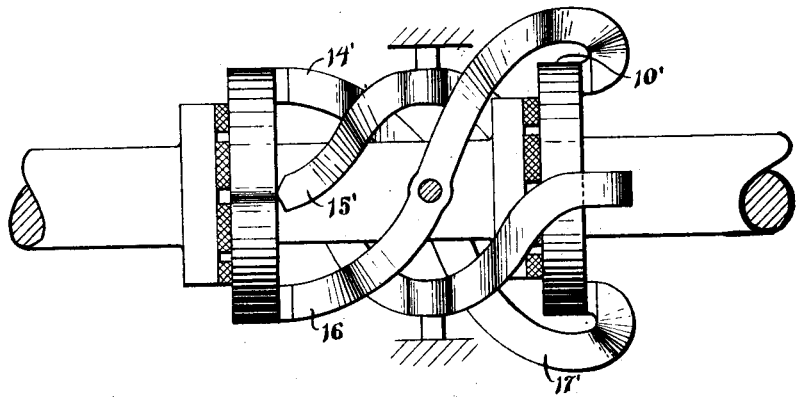

In the accompanying drawing, Fig. 1 is a side view, partially diagrammatic, of a thrust bearing constructed in accordance with my invention, and Fig. 2 is a similar view of a modification of the thrust bearing shown in Fig. 1.

In the construction of thrust bearings for the sustenance of extremely heavy thrust loads, as, for example, on the propeller shafts of ships, it is frequently found extremely difficult to make up all the load on a single thrust collar and it has, therefore, been proposed to sub-divide this load among two or more thrust collars, each taking a desired portion thereof.

In accordance with the present invention, I provide, for example, two fixed thrust collars encircling a common shaft and disposed in spaced relation one to the other, and I further provide a plurality of arcuate equalizing levers which engage said collars at their respective ends so far as to receive therefrom thrusts in the same direction, and I further provide fixed pivots for said arcuate members, said pivots being intermediate the ends of the respective levers, both in a linear and in an angular sense, all as will be hereinafter more fully pointed out.

Referring to Fig. 1 of the drawing for a more detailed understanding of my invention, I show a rotating shaft 5—5, carrying a thrust in the direction indicated by an arrow 6. Suitable flanges 7 and 8 are carried by said shaft and respectively transmit thrust therefrom to appropriately disposed fixed collars 9 and 10. I have shown the fixed collars 9 and 10 as provided with tilting bearing blocks 12 and 13 of the well-known Kingsbury type, although this particular feature forms no part of the present invention.

A number of arcuate levers 14, 15, 16 and 17 are provided, each engaging the right-hand face of the fixed collar 9 in compression, as shown, the contact being made preferably in a knife edge. Similarly, each of the arcuate levers is connected to the left-hand face of the fixed collar 10 through a tensile connection as shown at 18, 19 and 20. The arcuate lever 16 is shown as engaging the collar 9 at a point substantially 180° removed in an angular sense from its point of engagement with the collar 10 and similarly, with respect to the remaining levers. While I have thus illustrated an 180° throw of the levers, this particular angle is in no sense necessary, but the function of my invention may be attained with any desired angular throw.

The lever 16 is pivoted intermediate its length, as indicated at 20, and not only is the pivot 20 intermediate of the length of the lever 16 but it is also intermediate the ends thereof in an angular sense, and similarly the remaining levers are all pivoted. The pivots 20 are carried by any suitable supporting structure 21 and they serve as supporting means for the non-rotatable collars 9 and 10 which carry the thrust shoes.

Having thus described the arrangement of a structure embodying my invention, the operation is as follows: Assuming that it is desired to equally distribute the thrust between the two thrust-receiving collars, the pivot 20 is located at the mid-point of the lever 16. If the thrust upon the collar 9 exceeds that upon the collar 10, the left-hand end of each of the levers is forced back to a slight extent, bringing forward the right-hand ends of said levers and slightly moving the collar 10 toward the left, with a slight relative rotation of the collars, thus causing the collar 10 to assume a greater portion of the total thrust, and, similarly, if the thrust, on the collar 10 exceeds that on the collar 9, the right-hand end of each of the levers move slightly toward the right, moving each of the left-hand ends toward the left, and causing the collar 9 to assume a greater share of the thrust.

While I have illustrated the pivots as located at the mid-points of the respective levers for the equalization of the thrusts between the collars 9 and 10, it will be obvious that by locating the pivot at any other desired point, the thrusts may be divided in accordance with a predetermined ratio of, for example, two to one.

From the foregoing, it will be obvious that the right-hand end of the lever 16, for example, must be on the other side of the pivot 20, in an angular sense with respect to the longitudinal axis of the shaft 5, than is the left-hand end of the lever 16 as otherwise the forces would not act to produce the desired result.

The form of my invention shown in Fig. 2 is in general similar to that shown in Fig. 1 with the exception that the levers 14', 15', 16' and 17' are extended over the collar 10' so as to engage the rear face thereof in compression rather than to engage the front face thereof in tension. The operation of the device of Fig. 2 will be obvious from a consideration of the operation of the structure shown in Fig. 1.

While I have illustrated a group of four levers for performing the thrust-distributing function, it will be obvious to those skilled in the art that any desired number may be employed, although a minimum of three is in most cases necessary and in fact the use of three levers ensures proper distribution of stress among the respective levers in a highly advantageous manner, in a manner similar to the action of the well-known three-point suspension.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In equalizing means for a thrust bearing of the multiple-collar type, the combination with two substantially fixed thrust-receiving collars encircling a common shaft, of a plurality of arcuate members, each so engaging said collars at its respective ends as to receive thrust therefrom in the same direction, the points of engagement of the ends of a given member being substantially diametrically opposite with respect to each other, and a fixed and supporting pivot at an intermediate point of each member.

2. In a multiple-collar thrust bearing, the combination with two substantially fixed thrust-receiving collars, of a helical lever member engaging said collars at its respective ends at points angularly displaced with respect to each other, and a fixed and supporting pivot for said lever intermediate its ends and angularly intermediate said points of engagement, the ratios of the respective lever arm defined by said pivot being inversely proportional to the respective loads which it is desired that said collars assume.

3. In a multiple-collar thrust bearing, the combination with two substantially fixed thrust-receiving collars, of an arcuate lever member engaging said collars at its respective ends at points substantially 180° apart, and a fixed pivot for said lever member angularly intermediate its ends, the lengths of the lever arms defined thereby being inversely proportional to the respective loads which it is desired that said collars assume.

4. In a multiple-collar thrust bearing, the combination with two substantially fixed thrust-receiving collars, of an arcuate lever member engaging said collars at its respective ends at points substantially fixed thrust-receiving collars, of an arcuate lever member engaging said collars at its respective ends at points substantially 180° apart, and a fixed pivot for said lever member, disposed substantially 90° away from the respective ends and substantially midway of the length of said lever, whereby the loads transmitted to the respective ends of said lever are substantially equalized.

5. In a multiple-collar thrust bearing the combination with two substantially fixed thrust-receiving collars, of a plurality of helical levers, each engaging each of said collars at its respective ends to receive thrust therefrom, and a thrust-receiving pivot associated with each of said levers.

6. In a multiple-collar thrust bearing, the method of adjusting the relative loads taken by each of two collars which comprises balancing a thrust received from one point of one collar against a thrust received from a point of the other collar, the latter point being disposed diametrically opposite from said first mentioned point.

7. In a multiple thrust bearing construction, the combination of a rotary member having a pair of axially-spaced collars thereon, a pair of thrust-resisting collars arranged in cooperative relation with the first collars, a plurality of lever members extending both axially and circumferentially with respect to said member and having the ends thereof supporting said thrust-resisting collars, said lever members being so disposed that the points of support for each thrust-resisting collar are substantially equi-distantly spaced angularly, and supporting pivot means for the lever members.

8. In a multiple-collar thrust bearing, the combination with two fixed thrust-receiving collars, of a helical lever member disposed therebetween in compressive connection to one of said collars and in tensile connection with the other thereof, and an intermediate fixed pivot for said lever.

In testimony whereof, I have hereunto subscribed my name this 11th day of October, 1922.

ANDREW B. REAVIS.